Oct. 13, 1964   R. C. BUELER   3,152,844
CONTROL VALVE
Filed Oct. 25, 1963   4 Sheets-Sheet 1

INVENTOR
RICHARD C. BUELER
BY
Joseph E. Papin

United States Patent Office 3,152,844
Patented Oct. 13, 1964

3,152,844
CONTROL VALVE
Richard C. Bueler, Glendale, Mo., assignor to Wagner Electric Corporation, St. Louis, Mo., a corporation of Delaware
Filed Oct. 25, 1963, Ser. No. 318,875
29 Claims. (Cl. 303—52)

This invention relates to control valves and in particular to control valves for controlling a plurality of fluid pressure systems.

In the past, control valves were provided with a pair of flow passages respectively connected between a pair of fluid pressure sources and a pair of fluid pressure responsive motors which comprised, for all practical purposes, separate primary and secondary fluid pressure systems, and a pair of valve means were provided in the past control valves to control pressure fluid flow through said flow passages in response to actuation by a pair of valve control members. An undesirable or disadvantageous feature of the past control valves was the inherent sequential operation of the secondary system with respect to the primary system or the sequential establishment of fluid pressure flow in said flow passages. This sequential operation was due to a crack open force which opposed the actuation of the valve means in the secondary system, said crack open force being broadly defined as the additive forces of the valve control member return springs, the valve means return springs, the various frictions of the moving parts, and the pressure head tending to seat or close the valve means. The crack open pressure needed in the secondary system to overcome the crack open force in the past control valves was in the order of from seven to ten p.s.i. which defined the magnitude of the pressure differential between the primary and secondary systems. Of course, it was also an undesirable feature to have such an appreciable pressure differential between the systems resulting in unequal and sequential operation noticeable to the operator.

The object of the present invention is to provide a control valve which overcomes the aforementioned undesirable feature.

Another object of the present invention is to provide a control valve having a pair of application means therein for controlling separate fluid pressure systems including a resilient force transmitting connection between said application means to effect substantially simultaneous actuation of said separate systems.

Another object of the present invention is to provide a control valve having a pair of application means therein including resilient means for pre-loading one of said application means in response to actuating movement of the other of said application means.

Another object of the present invention is to provide a control valve having a pair of valve means and a pair of valve control members therefor including means for resiliently urging one of said valve control members into engagement with one of said valve means and preloading said one valve control member in response to valve means actuating movement of the other of said valve control members.

Still another object of the present invention is to provide a control valve having a pair of valve means and valve control members therefor including resilient means connected between said valve control means to provide for substantially simultaneous actuation of said valve means by said valve control members.

And still another object of the present invention is to provide a control valve having a pair of valve means and valve control members for controlling separate flow passages including a resilient connection between said valve control members to substantially obviate a pressure differential between said flow passages upon valve means actuating movement of said valve control members.

A still further object of the present invention is to provide a control valve having a pair of valve means and a pair of force responsive valve control members including resilient means connected therebetween for concertly urging one of said valve control members into pre-loaded engagement with one of said valve means prior to the engagement of the other of said valve control means with said other valve means wherein said one valve control member is further movable in response to the fluid pressure established when said other valve control member opens said other valve means to effect the opening of said one valve means in a time sequence substantially simultaneous with the opening of said other valve means.

These and other objects and advantages of the present invention will become apparent hereinafter.

Briefly, the invention embodies a control valve including a resilient connection between a pair of force responsive members for controlling the application of fluid pressure between a pair of fluid pressure sources and a pair of fluid pressure responsive motors, said resilient connection being effective to pre-load one of said members in response to movement of the other of said members so as to predetermine substantially simultaneous application of fluid pressure between said sources and motors.

The invention also consists in the parts and arrangements and combination of parts hereinafter described and claimed. In the accompanying drawings which form a part of the specification and wherein like numerals refer to like parts wherever they occur:

Figure 1:
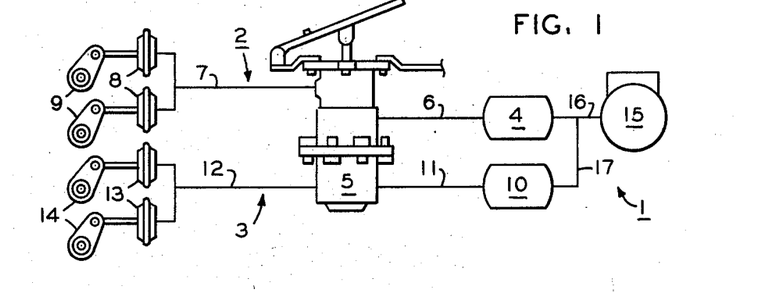
FIG. 1 is a diagrammatic view of a fluid pressure system showing a control valve embodying the present invention therein.

Referring now to FIG. 1, a dual brake actuating system 1 is shown having separated fluid pressure branches, indicated generally at 2 and 3. The branch 2 includes a reservoir 4 for fluid pressure storage which is connected to one of a pair of separate inlet ports of a treadle operated tandem control valve 5 by a conduit 6. The tandem control valve 5 is also provided with a pair of separate outlet ports, and a service line or conduit 7 connects one of said outlet ports with a set of fluid pressure responsive motors or brake chambers 8 which are linked with slack adjustors 9 to control the energization of an axle set of vehicle brake assemblies (not shown). The branch 3 includes a reservoir 10 for fluid pressure storage which is connected to the other of the inlet ports of the control valve 5 by a conduit 11, and another service line or conduit 12 connects the other of the outlet ports of said control valve with another set of fluid pressure responsive motors or brake chambers 13 which are linked with slack adjustors 14 to control the energization of another axle set of vehicle brake assemblies (not shown). To complete the system 1, a compressor 15 is connected with the reservoir 4 by a conduit 16 and with the reservoir 10 by a conduit 17 which branches from the conduit 16, said compressor and separate reservoirs forming, in combination, separate fluid pressure sources.

Figure 2:
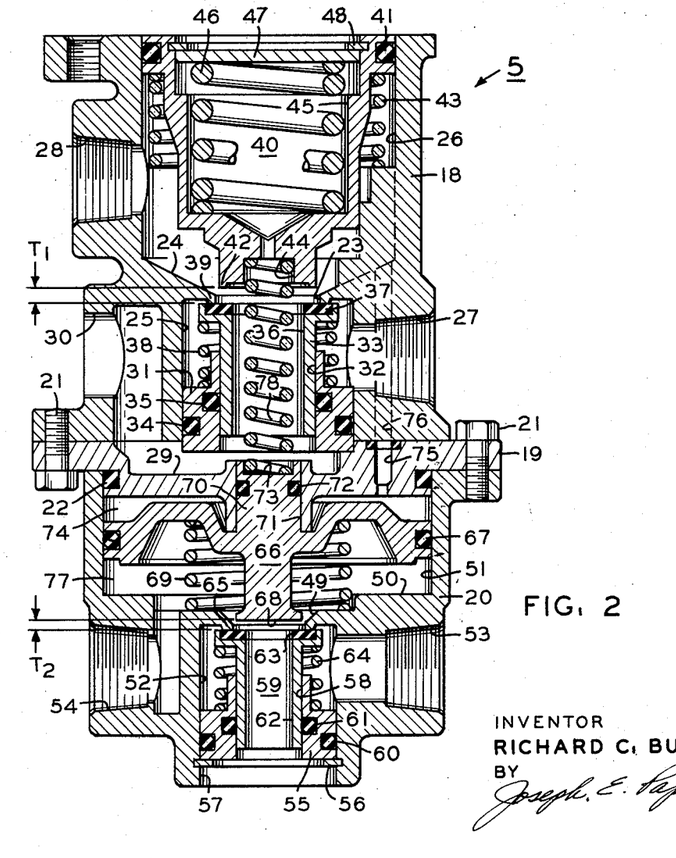
FIG. 2 is a greatly enlarged cross-sectional view of control valve shown in FIG. 1 embodying the present invention.

The control valve 5, FIG. 2, is provided with upper, intermediate and lower housings 18, 19 and 20 which are interconnected by suitable means, such as studs 21, and a sealing member or O-ring 22 is sealably interposed between said intermediate and lower housings.

The upper housing 18 is provided with a bore 23 defining an annular wall or partition 24 axially positioned between a counterbore 25 and a stepped counterbore 26, said counterbores defining a set of inlet and outlet chambers, respectively. An inlet port 27 which receives the conduit 6, as previously mentioned, is provided in the upper housing 18 connecting with the counterbore 25, and an outlet or working port 28 which receives the service line 7, as previously mentioned, is also provided in said upper housing connecting with the counterbore 26. A recess 29 is provided in the intermediate housing beneath the counterbore 25 defining an exahust chamber in combination with an exhaust port 30 provided in the upper housing 18. A valve guide member 31 is received in the counterbore 25 and is normally seated on the intermediate housing 19. The valve guide member 31 is provided with a bore 32 in which an inlet valve element 33 is slidable and seals 34, 35 are carried by said valve guide member in sealing engagement with the counterbore 25 and said inlet valve element, respectively. The inlet valve element 33 is provided with an axial bore or opening 36 therethrough and has an annular resilient sealing member or disc 37 on one end thereof in circumscribing relation with said exhaust opening. A valve spring 38 is biased between the valve guide member 31 and the inlet valve 33 normally urging the valve seal 37 into sealing engagement with a valve seat 39 formed on the wall 24 in circumscribing relation with the housing bore 23.

A reaction piston or valve control member 40 is slidably received in the counterbore 26 and a seal 41 is carried by said reaction piston in sealing engagement with said counterbore. The reaction piston 40 is provided with a valve seat 42 which is spaced a predetermined distance or travel $T_1$ from the valve seal 37 of the inlet valve 33 by a return spring 43 interposed between said reaction piston and the upper housing 18 and normally urging said reaction piston to its normally released or normally inoperative position, as shown. A spring receiving recess 44 is provided in the lower end of the reaction piston 40, said recess being coaxial with the valve seat 42 and the exhaust opening 36 of the inlet valve 33. A metering spring bore 45 is provided in the reaction piston 40, and a precompressed metering spring 46 is retained therein by a retainer or treadle force receiving plate 47 which is biased into abutting engagement with a snap ring and groove assembly 48 provided in the upper end of said metering spring bore.

The lower housing 20 is provided with a bore 49 defining an annular wall or partition 50 axially positioned between counterbores 51 and 52, said counterbore 52 defining a separate inlet chamber. Another inlet port 53 which receives the conduit 11, as previously mentioned, is provided in the lower housing 20 connecting with the counterbore 52, and another outlet or working port 54 which receives the other service line 12, as previously mentioned, is connected with the counterbore 51. Another valve guide member 55 is positioned in the counterbore 52 against displacement by a snap ring and groove assembly 56 provided adjacent the lower end of said counterbore, and said lower end of said counterbore forms an exhaust port 57. The valve guide member 55 is provided with a bore 58 in which another inlet valve element 59 is slidable and seals 60 and 61 are carried by said valve guide member in sealing engagement with the counterbore 52 and said inlet valve element, respectively. The inlet valve element 59 is provided with an axial bore or exhaust opening 62 and has an annular resilient sealing member or disc 63 on one end thereof in circumscribing relation with said exhaust opening. A spring 64 is biased between the valve guide member 55 and the inlet valve element 59 normaly urging the sealing disc 63 into sealing engagement with a valve seat 65 which is formed on the wall 50 in circumscribing relation with the housing bore 59. The inlet, outlet and exhaust ports 53, 54 and 57 form one separate set of ports in the lower housing 20 and the inlet, outlet and exhaust ports 27, 28 and 30 form another separate set of ports in the upper housing 18.

A relay piston or valve control member 66 is slidably received in the counterbore 51 and a seal 67 is carried by said relay piston in sealing engagement with said counterbore. The relay piston 66 is provided with a valve seat 68 which is normally maintained a predetermined distance or travel $T_2$ from the valve seal 63 by a return spring 69 interposed between the housing wall 50 and said relay piston to urge said relay piston toward its normal released or inoperative position, as shown. It should be noted that the travel $T_2$ between the relay piston valve seat 68 and the inlet valve seal 63 is less than the travel $T_1$ between the reaction piston valve seat 42 and the inlet valve seal 37. A guide extension 70 is integrally provided on the relay piston 66 and is slidably received in a centrally located bore 71 provided in the intermediate housing 19, said guide extension having a cross-sectional area substantially equal to the area of the relay piston valve seat 68, and a seal 72 is carried by said guide extension in sealing engagement with said bore. Another spring receiving recess 73 is provided in the upper end of the guide extension 70, said spring receiving recess being axially aligned with the spring recess 44 in the reaction piston 40 and the exhaust opening 36 of the inlet valve 33. An expansible application or control chamber 74 is defined in the counterbore 51 between one side of the relay piston 66 and the intermediate housing 19 and said application chamber is connected in open pressure fluid communication at all times with the counterbore 26 in the upper housing 18 by aligned passages 75 and 76 provided in the upper and intermediate housings 18 and 19. An outlet or working chamber 77 is also defined in the bore 51 between the other side of the relay piston 66 and the housing wall 50, and said outlet chamber is in open pressure fluid communication with the outlet port 54.

The present invention is primarily concerned with means to predetermine substantially simultaneous actuation of the system branches 2, 3 by effecting substantially simultaneous opening of the valve elements 33, 59 which control said branches, and to this end a resilient connection in the form of a resilient force transmitting member or spring 78 is biased between the reaction and relay pistons 40, 66, said spring extending coaxially through the exhaust opening 36 of the valve element 33 and having opposed ends seated in the reaction and relay piston recesses 44, 73. The main obstacle to the aforementioned simultaneous actuation of the branches 2, 3 and valve elements 33, 59 is the crack open force of the branch 3, said crack open force being broadly defined as the following combination of additive forces: (1) the compressive force of the relay piston return spring 69; (2) the compressive force of the valve element spring 64; (3) the friction forces of the moving parts, such as the relay piston 66 and valve element 59; and (4) the force of the pressure head in the inlet chamber 52 acting on the effective area of the valve element 59 tending to maintain said valve element in sealing engagement with the valve seat 65. In other words, the combination of the aforementioned additive forces or the crack open force substantially defines the total force necessary to bring the branch 3 into operation over and above the force necessary to bring the branch 2 into operation.

Figure 3:
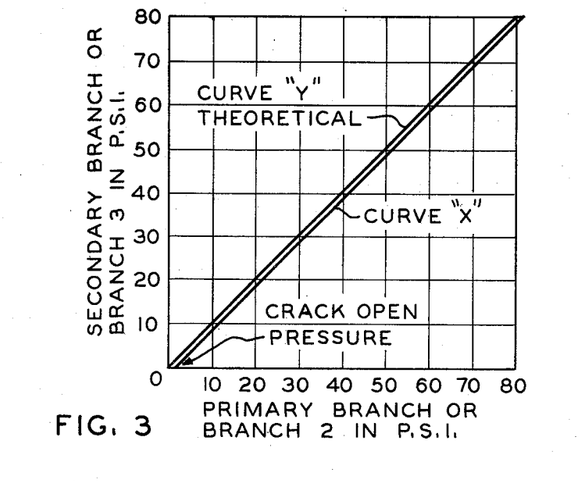
FIG. 3 is a graph illustrating the comparative pressures between the branches of the fluid pressure system of FIG. 1.
Figure 4:
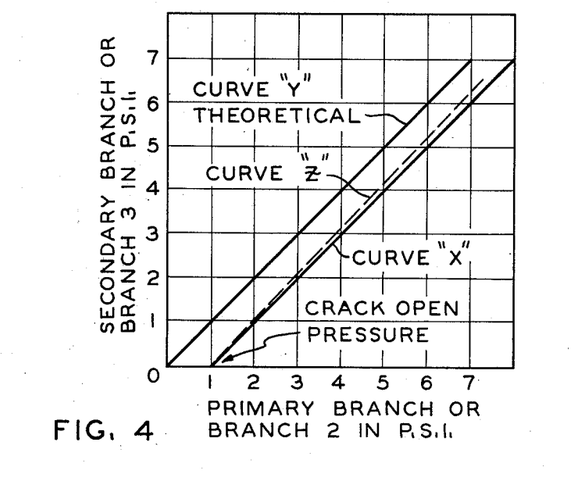
FIG. 4 is a greatly enlarged graph showing a portion of the graph of FIG. 3 in detail.

In the graphs of FIGS. 3 and 4, the pressures in the secondary branch or branch 3 are shown as the ordinate in p.s.i. against the corresponding pressures in the primary branch or branch 2 which are shown as the abscissa in p.s.i. The curve "Y" illustrates the theoretical plot of corresponding pressures in the branches 2, 3, wherein any established pressure in the branch 2 results in a proportional pressure in the branch 3. The curve "X" illustrates the actual plot of the corresponding pressures in the branches 2, 3 which takes into consideration or includes the aforementioned crack open force. Of course, the lateral displacement of the curve "X" from the curve "Y" defines the magnitude of the crack open pressure which is the additional pressure needed to supplement the applied force in order to overcome the crack open force, as will be discussed hereinafter.

In the operation of the control valve 5 in the system 1, assuming the component parts thereof are positioned as above described, a manual force applied on the force receiving plate 47 of the reaction piston 40 moves said reaction piston downwardly against the force of the return spring 43, and the force transmitting spring 78 transmits the applied force to the relay piston 66 to effect concert downward movement thereof. Since the travel $T_1$ is predeterminately less than the travel $T_2$, the concert downward movement of the reaction and relay pistons 40, 66 initially engages the relay piston valve seat 68 with the valve 59 closing the exhaust passage 62 therein. Further downward movement of the reaction piston 40 serves to compress the spring 78 so that the compressive force thereof serves to bias or pre-load the relay piston 66 in a direction to further engage the seat 68 with the valve element 59. In this manner, the direct movement of the relay piston 66 in response to the applied force transmitted thereto by the spring 78 and the compressive spring rate or build-up of the spring 78 serves to pre-load the relay piston 66 to approximate or substantially balance the crack open force. The aforementioned further downward movement of the reaction piston 40 also engages the seat 42 with the valve element 33 to close the exhaust passage 36 isolating the outlet chamber 26 from the atmosphere and thereafter disengage said valve element from the seat 39 on the wall 24 to establish pressure fluid communication between the inlet and outlet ports 27, 28. The pressure fluid flows from the reservoir 4 through the conduit 6, the inlet port 27, the inlet chamber 25, the connecting passage 23 and the outlet chamber 26 into the outlet port 28 and therefrom through the service line 7 to actuate brake chambers 8 and rotate slack adjustors 9 to energize the axle set of wheel brake assemblies (not shown) associated therewith. At the same time, the fluid pressure so established in the outlet chamber 26 flows therefrom through housing passages 75, 76 into the application chamber 74 and acts on the effective area of the pre-loaded relay piston 66 to create an application force which is additive to the applied or pre-load force on said relay piston to overcome the crack open force and disengage the valve element 59 from the housing seat 65 to establish pressure fluid communication between the inlet and outlet ports 53, 54. The pressure fluid flows from the reservoir 10 through the conduit 11, the inlet port 53, the inlet chamber 52, the connecting passage 49, the outlet chamber 77 and outlet port 54 and therefrom through the service line 12 to actuate the brake chambers 13 and rotate the slack adjustors 14 to energize the axle set of wheel brake assemblies (not shown) associated therewith. It should be noted that the applied force and the compressive force of the spring 78 predeterminately limits the pre-loading of the relay piston 66 so that such pre-load is just less than the crack open force necessary to open the valve element 59, and the additional application force applied to the pre-loaded relay piston effects the opening of said valve element. It should also be noted that the magnitude of the additional fluid pressure in the application chamber 74 acting on the relay piston 66 and needed to overcome the crack open force is defined as the crack open pressure which predetermines the magnitude of the pressure differential between the branches 2, 3. In this manner, it is apparent that the pre-load on the relay piston is predetermined to approximate or be substantially the same as the crack open force and serves to minimize or substantially obviate the crack open pressure or pressure differential between the branches 2, 3 wherein said branches as well as the valve elements 33, 59 are actuated substantially simultaneously.

When the reaction force created by the established fluid pressure in the outlet chamber 26 acting on the effective area of the reaction piston 40 equals the manually applied force, said reaction piston is moved upwardly against the the metering spring 46 wherein the inlet valve 33 is positioned in lapped engagement with the valve seat 39 and the reaction piston valve seat 42 is positioned in lapped engagement with said inlet valve. The reaction force acting through the metering spring 46 against the manually applied force on the plate 47 affords the operator an accurate and direct "feel" as to the extent of the breaking effort or application. Similarly, when the reaction force created by the established fluid pressure in the outlet chamber 77 acting on the effective area of the relay piston 66 equals the application force in addition to the pre-load or manually applied force on said relay piston, the resilient connection or spring 78 permits upward or lapping movement of said relay piston wherein the valve element 59 is positioned in lapped engagement with the housing valve seat 65 and the relay piston valve seat 68 is positioned in lapped engagement with said inlet valve. If greater braking effort is desired, the manually applied force is increased which results in an increased application force and the component parts of the control valve 5 function in the same manner as previously described to again move said component parts to their lapped positions.

When the desired braking effort is attained, the manually applied force is removed from the reaction piston 40 and the return springs 38 and 43 move the valve element 33 and reaction piston 40 upwardly to their original positions. Initially, this upward movement sealably re-engages the valve element 33 with the housing valve seat 39 to interrupt pressure fluid communication between the inlet and outlet ports 27 and 28 and further upward movement of the reaction piston 40 disengages its seat 42 from the valve element 33 to re-establish communication between the outlet port 28 and the atmosphere and de-energize the wheel brake assemblies associated therewith by exhausing pressure fluid from the brake chambers 8 through the service line 7 and said outlet port, the outlet chamber 26, the valve member exhaust passage 36, the recess 29 of the intermediate housing 19 and the exhaust port 30 in the upper housing 18. At the same time, the fluid pressure is exhausted from the application chamber 74 through the passages 75 and 76 into the outlet chamber 26 and therefrom to amosphere, as previously described, to eliminate the application force on the relay piston 66. Upon the elimination of the application force, the forces of the return springs 64 and 69 move the valve element 59 and the relay piston 66 upwardly to their original positions. Initially, this upward movement sealably re-engages the valve element 59 with the housing valve seat 65 to interrupt pressure fluid communication between the inlet and outlet ports 53 and 54 and further upward movement of the relay piston 66 disengages its seat 68 from the valve element 59 to open the valve element exhaust passage 62 and reestablish communication between the outlet port 54 and the atmosphere to de-energize the wheel brake assemblies associated therewith by exhausting fluid pressure from the brake chambers 13 through the service line 12, said outlet port, the outlet chamber 77, and the valve member exhaust passage 62 to the exhaust port 57.

Figure 5:
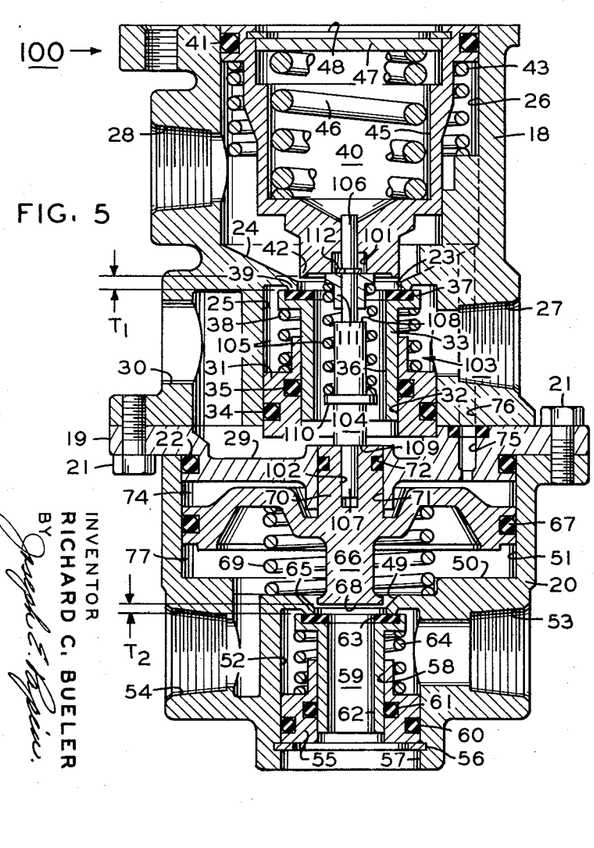
FIGS. 5 thru 8 are cross-sectional views of other control valves embodying the present invention and adapted for use in the system of FIG. 1.

Referring now to FIG. 5, a control valve 100 is shown therein having the same component parts and functioning in the system 1 in the same manner as the previously described control valve 5 with the following exceptions.

The reaction piston 40 of the control valve 100 is provided with a stepped recess 101 which is coaxial with the valve seat 42 and the exhaust opening 36 of the valve element 33, and the guide extension 70 of the relay piston 66 is provided with a recess 102 in the upper end thereof substantially in axial alignment with the stepped recess 101. A resilient connection, indicated generally at 103, is provided between the reaction and relay pistons 40, 66 including a rigid force transmitting member or lost motion linkage 104 and a resilient force transmitting member or spring 105. The link 104 is provided with opposed free end portions 106, 107 of reduced diameter and opposed abutment surfaces 108, 109. The free ends 106, 107 of the link 104 are slidably received in the recesses 101, 102 of the reaction and relay pistons 40, 66, and the abutment surface 109 is normally engaged with the upper end of the relay piston guide extension 70. The link 104 is also provided with a flange 110 near the mid-portion thereof which seats one end of the spring 105, and a spring retainer or sleeve member 111 which seats the other end of said spring is slidably received on the free end 106 of said link and retained thereon against displacement by a snap ring 112. The upper end of the sleeve 111 is normally engaged with the reaction piston 40 about the recess 101 therein, and the spring 105 normally urges said sleeve into abutment with the snap ring 112 and away from abutment with the cooperating abutment surface 108 on the link 104.

In the operation, the applied force which effects initial downward movement of the reaction piston 40 is transmitted through the spring 105 and the link 104 to concertly move the relay piston 66 downwardly to effect the travel $T_2$ of the valve seat 68 into sealing engagement with the valve element 59 thereby closing the exhaust opening 62 and interrupting pressure fluid communication between the outlet and exhaust ports 54, 57. Subsequent downward movement of the reaction piston 40 completes the travel $T_1$ of its valve seat 42 into sealing engagement with the valve element 33 to close the exhaust opening 36 and disengage said valve element from the housing valve seat 39 thereby interrupting pressure fluid communication between the outlet and exhaust ports 28, 30 and establishing pressure fluid communication between the inlet and outlet ports 27, 28. The subsequent downward movement of the reaction piston 40 also serves to move the sleeve 111 downwardly on the linkage end portion 106 to compress the spring 105 which effects further sealing engagement of the relay piston valve seat 68 with the valve element 59. In this manner, the direct movement of the relay piston 66 in response to the applied force transmitted thereto by the resilient connection 103 and the compressive spring rate or build-up of the spring 105 serves to pre-load the relay piston to approximate or substantially balance the crack open force. The fluid pressure established upon the opening of the valve element 33 flows through the housing passages 75, 76 into the application chamber 74 and acts on the effective area of the preloaded relay piston 66 to create an application force additive to the applied or pre-load force on said relay piston to overcome the crack open force effecting further relay piston movement to disengage the valve element 59 from the housing valve seat 65 and establish pressure fluid communication between the inlet and outlet ports 53, 54.

When the reaction force created by the established fluid pressure in the outlet chamber 26 acting on the effective area of the reaction piston 40 equals the manually applied force, said reaction piston is moved upwardly against the metering spring 46 wherein the valve element 33 is positioned in lapped engagement with the housing valve seat 39 and the valve seat 42 is positioned in lapped engagement with said valve element. Similarly, when the reaction force of the established fluid pressure in the outlet chamber 77 acting on the effective area of the relay piston 66 equals the application force in addition to the pre-load or manually applied force on said relay piston, the resilient connection 103 permits upward or lapping movement of said relay piston wherein the valve element 59 is positioned in lapped engagement with the housing valve seat 65 and the valve seat 68 is positioned in lapped engagement with said valve element. If a greater braking effort is desired, the manually applied force is increased which results in an increased application force, and the component parts of the control valve 100 function in the same manner as previously described to again move said component parts to their lapped positions. Of course, when the manually applied force is removed to terminate the braking effort or application, the component parts of the control valve 100 are returned to their original positions, substantially in the same manner as previously described for the control valve 5.

It should be noted that the effective cross-sectional area of the relay piston guide extension 70 responsive to the atmosphere at the exhaust port 30 is less than the effective cross-sectional area of the relay piston valve seat 68 responsive to the atmosphere at the exhaust port 57; therefore, the effective area of the relay piston 66 in the application chamber 74 is greater than the opposing effective area of said relay piston in the outlet chamber 77. In view of the above, it is apparent that the resulting fluid pressure in the branch 3 will increase in response to fluid pressure in the application chamber 74 in a ratio proportional to the abovementioned effective areas, as illustrated by the dotted curve "Z" in FIG. 4. In effect, the curve "Z" will more closely approximate or be displaced laterally toward the theoretical curve "Y" at the higher operating pressures in the branches 2, 3 thus effectively further reducing the pressure differential between said branches at the higher operating pressures.

In the event of the failure of the branch 2 with a resultant loss of the fluid pressure in the reservoir 4, the manually applied force on the reaction piston 40 is transmitted directly to the relay piston 66 through the resilient connection 103 to effect a direct actuation of the valve element 59. In this manner, the reaction piston 40 is moved downwardly in response to the applied force thereon to actuate the valve element 33, as previously described; however, since it is assumed that the branch 2 has failed, the establishment of fluid pressure in said branch is obviated. Of course, the transmission of the manually applied force through the resilient connection 103 is accomplished upon movement of the reaction piston 40 which compresses the spring 105 and slidably moves the sleeve 111 downwardly with respect to the link 104 to engage said sleeve with the abutment surface 108 on the link 104. In this manner, the resilient connection 105, in effect, becomes a rigid force transmitting connection or member so that further downward movement of the reaction piston 40 effects actuation of the relay piston 66 to open the valve member 59 and establish pressure fluid flow in the branch 3, as previously described. The fluid pressure established in the outlet chamber 77 acts on the effective area of the relay piston 66 to create a reaction force in opposition to the applied force thereby affording the operator a direct and accurate "feel" as to the extent of the braking application.

In the event of the failure of the branch 3 with a resultant loss of fluid pressure in the reservoir 10, the manually applied force on the reaction piston 40 actuate the valve member 33 to establish fluid pressure in the branch 3 and the application chamber 74, as previously described, and the fluid pressure in the application chamber 74 serves to bottom or move the relay piston 66 into engagement with the housing wall 50 while actuating the valve member 59; however, since it was assumed that the branch 3 has failed, the establishment of fluid pressure in said branch is, of course, obviated. The resilient connection 103 moves with the relay piston 66 to its bottomed position and thus does not interfere with the reaction piston 40. Nevertheless, the fluid pressure established in the outlet chamber 26 acts on the effective area of the reaction piston 40 to create a reaction force which moves said reaction piston upwardly against the applied force to compress the metering spring 46, and in this manner, the operator is afforded a direct and accurate "feel" as to the extent of the braking effort or application.

Figure 6:
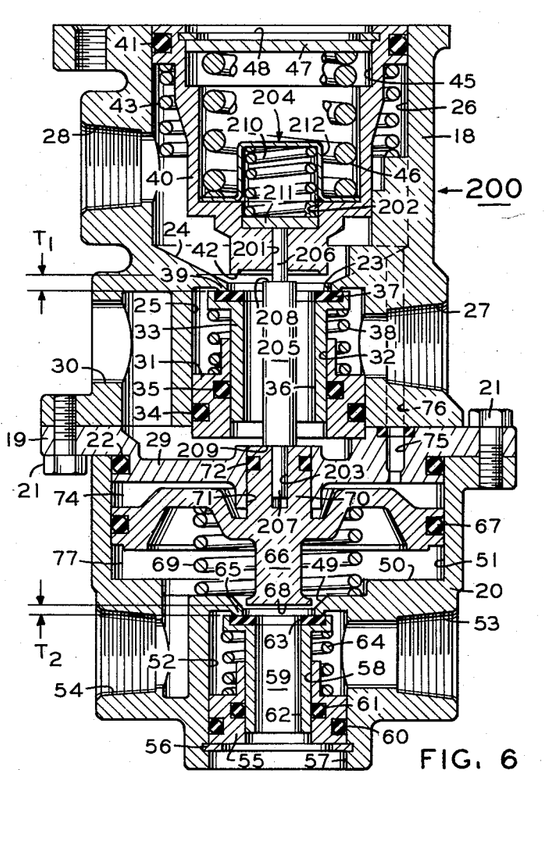

Referring now to FIG. 6, a control valve 200 is shown having the same component parts and functioning in the system 1 in the same manner as the previously described control valves 5 and 100 with the following exceptions.

The reaction piston 40 in the control valve 200 is provided with a bore and counterbore 201 and 202 which are coaxial with the metering spring bore 45, and the guide extension 70 of the relay piston 66 is provided with a bore 203 in the upper end thereof in axial alignment with the bore and counterbore 201, 202. A resilient connection, indicated generally at 204, is provided between the reaction and relay pistons 40, 66 and includes force transmitting or lost motion linkage 205 which is provided with reduced free end portions 206, 207 respectively slidable in the reaction and relay piston bores 201, 203. The reduced free end portions 206, 207 define radial abutment shoulders 208, 209 on the link 205, said shoulder 209 being normally engaged with the upper end of the relay piston guide extension 70 and said shoulder 208 being normally spaced from the lower end of the reaction piston 40. The resilient connection 204 also includes an auxiliary spring or force transmitting member 210 and piston or retainer 211. The piston 211 is slidable in the counterbore 202 of the reaction piston 40 and is normally biased into abutting engagement with the upper end of the linkage free end 206 by the spring 210 which is retained against displacement from the piston 211 by a retainer member 212, said retainer member being fixedly positioned in abutting engagement between the metering spring 46 and the lower end wall of the metering spring bore 45 of said reaction piston.

In the operation, the applied force which effects initial downward movement of the reaction piston 40 is transmitted through the retainer member 212, the spring 210, the piston 211 and the link 205 to concertly move the relay piston 66 downwardly to effect the travel $T_2$ of the valve seat 62 into sealing engagement with the valve element 59 thereby closing the exhaust opening 62 and interrupting pressure fluid communication between the outlet and exhaust ports 54, 57. Subsequent downward movement of the reaction piston 40 completes the travel $T_1$ of its valve seat 42 into sealing engagement with the valve element 33 to close the exhaust opening 36 and disengage said valve element from the housing valve seat 39 thereby interrupting pressure fluid communication between the outlet and exhaust ports 28, 30 and establishing pressure fluid communication between the inlet and outlet ports 27, 28. The subsequent downward movement of the reaction piston 40 is, of course, relative to the link 205 and the piston 211 which serves to compress the spring 210 thereby effecting further sealing engagement of the relay piston valve seat 68 and the relay valve element 59. In this manner, the downward movement of the relay piston 66 in response to the applied force transmitted thereto by the resilient connection 204 and the compressive spring rate or build-up of the spring 210 serves to pre-load the relay piston to approximate or substantially balance the crack open force. The fluid pressure established upon the opening of the valve element 33 flows through the housing passages 75, 76 into the application chamber 74 and acts on the effective area of the pre-loaded relay piston 66 to create an application force additive to the applied or pre-load force on said relay piston to overcome the crack open force effecting further relay piston movement to disengage the valve element 59 from the housing valve seat 65 and establish pressure fluid communication between the inlet and outlet ports 53, 54.

When the reaction force created by the established fluid pressure in the outlet chamber 26 acting on the effective area of the reaction piston 40 equals the manually applied force, said reaction piston is moved upwardly against the metering spring 46 wherein the valve element 33 is positioned in lapped engagement with the housing valve seat 39 and the valve seat 42 is positioned in lapped engagement with said valve element. Similarly, when the reaction force of the established fluid pressure in the outlet chamber 77 acting on the effective area of the relay piston 66 equals the application force in addition to the pre-load or manually applied force on said relay piston, the resilient connection 103 permits upward or lapping movement of said reaction piston wherein the valve element 59 is positioned in lapped engagement with the housing valve seat 65 and the valve seat 68 is positioned in lapped engagement with said valve element. If a greater braking effort is desired, the manually applied force is increased which results in an increased application force and the component parts of the control valve 200 function in the same manner as previously described to again move said component parts to their lapped positions. Of course, when the manually applied force is removed to terminate the braking effort or application, the component parts of the control valve 200 are returned to their original positions substantially in the same manner as previously described for the control valves 5 and 100.

It should be noted that the effective cross-sectional area of the relay piston guide extension 70 responsive to the atmosphere at the exhaust port 30 is less than the effective cross-sectional area of the relay piston valve seat 68 responsive to the atmosphere at the exhaust port 57; therefore, the effective area of the relay piston 66 in the application chamber 74 is greater than the opposing effective area of said relay piston in the outlet chamber 77. In view of the above, it is apparent that the resulting fluid pressure in the branch 3 will increase in response to fluid pressure in the application chamber 74 in a ratio proportional to the abovementioned effective areas, as illustrated by the dotted curve "Z" in FIG. 4. In effect, the curve "Z" will more closely approximate or be displaced laterally toward the theoretical curve "Y" at the higher operating pressures in the branches 2, 3 thus effectively further reducing the pressure differential between the branches at the higher operating pressures.

In the event of the failure of the branch 2 with a resultant loss of the fluid pressure in the reservoir 4, the manually applied force on the reaction piston 40 is transmitted directly through the resilient connection 204 to the relay piston 66 to effect a direct actuation of the valve element 59. In this manner, the reaction piston 40 is moved downwardly in response to the applied force thereon to actuate the valve element 33, as previously described; however, since it was assumed that the branch 2 has failed, the establishment of fluid pressure in said branch is obviated. Of course, the transmission of the manually applied force through the resilient connection 204 is accomplished upon movement of the reaction piston 40 relative to the link 205 which serves to compress the spring 210 between the piston 211 and the retainer member 212 permitting said reaction piston 40 to move into abutting engagement with the abutment surface 208 on said link. In this manner, the resilient connection 204, in effect becomes a rigid force transmitting connection or member so that further downward movement of the reaction piston 40 effects actuation of the relay piston 66 to open the valve member 59 and establish pressure fluid flow in the branch 3, as previously described. The fluid pressure established in the outlet chamber 77 acts on the effective area of the relay piston 66 to create a reaction force in opposition to the applied force thereby affording the operator a direct and accurate "feel" as to the extent of the braking application.

In the event of the failure of the branch 2 with a resultant loss of the fluid pressure in the reservoir 10, the manually applied force on the reaction piston 40 actuates the valve member 33 to establish fluid pressure in the branch 3 and the application chamber 74, as previously described, and the fluid pressure in the application chamber 74 serves to bottom or move the relay piston 66 into engagement with the housing wall 50 while actuating the valve member 59; however, since it was assumed that the branch 3 has failed, the establishment of fluid pressure in said branch is, of course, obviated. The link 295 moves with the relay piston 66 to its bottomed position and thus does not interfere with the reaction piston 40. Nevertheless, the fluid pressure established in the outlet chamber 26 acts on the effective area of the reaction piston 40 to create a reaction force to move said reaction piston upwardly against the applied force to compress the metering spring 46, and in this manner, the operator is afforded a direct and accurate "feel" as to the extent of the braking effort or application.

Figure 7:
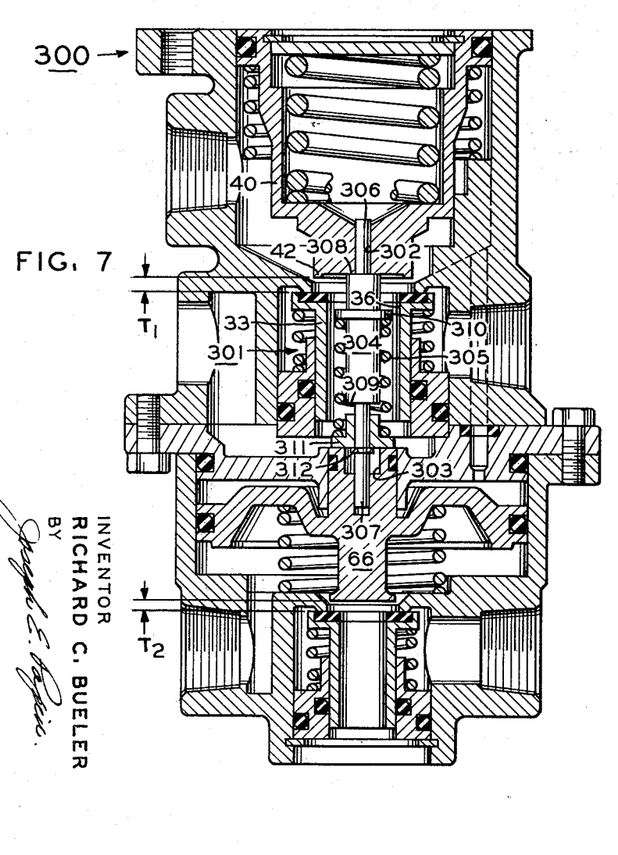

Referring now to FIG. 7, a control valve 300 is shown having substantially the same component parts and functioning in the system 1 in substantially the same manner as the previously described control valves 5, 100, and 200 with the exceptions that the resilient connection, indicated generally at 301, is inverted with respect to the resilient connection 103 of the control valve 100. The reaction piston 40 is provided with a bore or recess 302 which is coaxial with the valve seat 42 and the exhaust opening 36 of the valve element 33, and the relay piston is provided with a stepped bore or recess 303 in the upper end thereof substantially in alignment with the reaction piston bore 301. The resilient connection 301 is provided between the reaction and relay pistons 40, 66 including a rigid force transmitting member or lost motion linkage 304 and a resilient force transmitting member or spring 305. The link 304 is provided with opposed free end portions 306, 307 of reduced diameter and opposed abutment surfaces 308, 309. The linkage free ends 306, 307 are slidably received in the bores 302, 303 of the reaction and relay pistons 40, 46 and the abutment surface 308 is normally engaged with the lower end of the reaction piston 40. The link 304 is also provided with a flange 310 near the mid-portion thereof which seats one end of the spring 305, and a spring retainer or sleeve member 311 which seats the other end of said spring is slidably received on the linkage free end 306 and retained thereon against displacement by a snap ring 312. The lower end of the sleeve 311 is normally engaged with the relay piston 66 about the recess 303 therein, and the spring 305 normally urges said sleeve into abutment with the snap ring 312 and away from cooperating abutment with the abutment surface 309 on the link 304.

Figure 8:
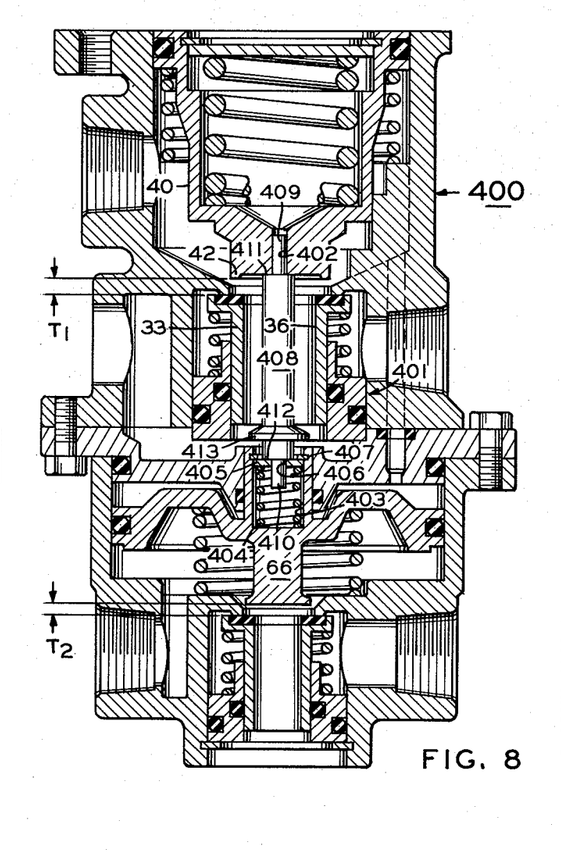

Referring now to FIG. 8, a control valve 400 is shown having substantially the same component parts and functioning in the system 1 substantially in the same manner as the previously described control valves 5, 100, 200 and 300 with the exception that the resilient connection, indicated generally at 401, of the control valve 400 is inverted with respect to the resilient connection 204 of the control valve 200. The reaction piston 40 is provided with a bore or recess 402 which is coaxial with the valve seat 42 and the exhaust opening 36 of the valve element 33, and the relay piston 66 is provided with a bore or recess 403 in the upper end thereof in alignment with the reaction piston bore 402. The resilient connection 401 includes a resilient force transmitting member or spring 404 and a piston or retainer 405 having a centrally located aperture or bore 406 therein. The piston 405 is slidable in the relay piston bore 403 and is normally biased into engagement with a snap ring or displacement preventing member 407 removably secured in the upper end of said relay piston bore. The resilient connection 401 also includes a rigid force transmitting or lost motion linkage 408 having opposed free end portions 409, 410 of reduced diameters which are respectively slidably received in the reaction piston bore 402 and the piston aperture 406. The reduced end portions 409, 410 of the link 408 define radial abutment surfaces 411, 412 respectively engaged with the reaction piston 40 and the piston 405, and a flange 413 is integrally formed on said link adjacent to the lower end thereof for lost motion engagement with the upper end of the relay piston 66 about the bore 403 therein.

From the foregoing, it is now apparent that novel control valves 5, 100, 200, 300 and 400 meeting the objects set out hereinbefore are provided and that changes or modifications as to the precise configurations, shapes and details of the constructions set forth in the disclosure by way of illustration may be made by those skilled in the art without departing from the spirit of the invention as defined by the claims which follow.

What I claim is:

1. In a fluid pressure system having a pair of fluid pressure sources and a pair of fluid pressure responsive motors, control means for controlling the application of fluid pressure from said sources to said motors including a housing, means within said housing providing a pair of pressure fluid flow passages for respective connection between said sources and motors, a pair of application means for controlling said flow passages, one of said application means being movable in response to an applied force thereon to an applying position to effect the application of fluid pressure through one of said flow passages, the other of said application means defining with said housing an expansible chamber, a resilient connection between said application means, said resilient connection being movable with said one application means upon movement thereof to the applying position to concertly move said other application means to an advanced position and apply a pre-loading force thereon, and other means within said housing providing passage for the applied fluid pressure from said one flow passage to said chamber, said other application means being movable from the advanced position in response to fluid pressure in said chamber and the pre-load force to an applying position to effect the application of fluid pressure through the other of said flow passages.

2. In the fluid pressure system according to claim 1 including a lost motion connection between said application means wherein said one application means is movable in response to the applied force into lost motion engagement with said other application means to thereafter concertly move said other application means from the advanced position to the applying position upon the failure of fluid pressure in said one flow passage.

3. In the fluid pressure system according to claim 1 including a pair of spaced abutment surfaces on said application means, respectively, wherein said one application means is movable in response to the applied force to engage the abutment surface thereon with the abutment surface on said other application means and thereafter concertly move said other application means from the advanced position to the applying position in the event of fluid pressure failure in said one flow passage.

4. In a fluid pressure system having a pair of fluid pressure sources and a pair of fluid pressure responsive motors, a control valve comprising a housing, means within said housing providing a pair of pressure fluid flow passages for connection with said sources and motors, respectively, a pair of valve means controlling said flow passages, a pair of valve control members in said housing for operative engagement with said valve means, one of said valve control members being movable in response to an applied force into engagement with one of said valve means to move said one valve means to a position establishing pressure fluid flow through one of said flow passages, the other of said valve control members defining with said housing an expansible chamber, a resilient connection between said valve control members and responsive to movement of said one valve control member to concertly move said other valve control member into engagement with the other of said valve means and apply a pre-loading force thereon, and means in said housing providing passage for the established pressure fluid flow from said one flow passage to said chamber, said other valve control member being further movable in response to the pre-load force and the established fluid pressure in said chamber to move said other valve means to a position establishing pressure fluid flow through the other of said flow passages.

5. In a fluid pressure system having a pair of fluid pressure sources and a pair of fluid pressure responsive motors, a control valve comprising a housing, means within said housing providing a pair of pressure fluid flow passages for connection between said sources and motors, respectively, a pair of valve means controlling said flow passages, a pair of valve control members in said housing for operative engagement with said valve means, one of said valve control members being initially movable in response to an applied force thereon into engagement with one of said valve means and subsequently movable in response to the applied force to move said one valve means to a position establishing pressure fluid flow through one of said flow passages, the other of said valve control members defining with said housing an expansible chamber, spring means connected between said valve control members, said spring means being moved and compressed in response to the applied force movement of said one valve control member to concertly move said other valve control member into engagement with the other of said valve means and apply a pre-loading force thereto prior to the engagement of said one valve control member with said one valve means, and passage means in said housing connecting said chamber in open pressure fluid communication with the established pressure fluid flow in said one flow passage, said other valve control member being subsequently movable in response to the pre-load force and the established fluid pressure in said chamber to move said other valve means to a position establishing pressure fluid flow in the other of said flow passages in a time sequence substantially simultaneous with the establishment of the pressure fluid flow in said one flow passage.

6. In a fluid pressure system having a pair of fluid pressure sources and a pair of fluid pressure responsive motors, a control valve comprising a housing, means within said housing defining a pair of pressure fluid flow passages for connection with said sources and motors, respectively, a pair of valve means in said flow passages and normally urged to positions interrupting pressure fluid flow therethrough, a pair of valve control members for operative engagement with said valve means, a resilient connection between said valve control members, one of said valve control members and resilient connection being concertly movable in response to an applied force to apply a loading force to the other of said valve control members and move said other valve control member into engagement with one of said valve means, said resilient connection being thereafter effective to increase the loading force on said other valve control member upon subsequent movement of said one valve control member in response to the applied force relative to said other valve control member and into engagement with the other of said valve means to move said other valve means to a position establishing pressure fluid flow through one of said flow passages, an expansible fluid pressure chamber in said housing, said other valve control member being movable in said chamber and normally opposing fluid pressure expansion thereof, and other means within said housing providing passage for the established pressure fluid flow from said one flow passage into said chamber, said other valve control member being subsequently movable in response to the loading force thereon and the established fluid pressure in said chamber to move said one valve means to a position establishing pressure fluid flow through the other of said flow passages substantially simultaneously with that established in said one flow passage.

7. In a fluid pressure system having a pair of fluid pressure sources and a pair of fluid pressure responsive motors, a control valve comprising a housing, a pair of pressure fluid flow passages in said housing for connection with said sources and motors, respectively, a pair of valve means normally urged to positions in said flow passages interrupting pressure fluid flow therethrough, a pair of valve control members slidable in said housing for operative engagement with said valve means, a resilient connection between said valve control members, said valve control members and resilient connection being concertly movable in response to an applied force thereon to engage one of said valve control members with one of said valve means and transmit the applied force thereto, said resilient means being thereafter compressed to increase the transmitted applied force on said one valve control member upon subsequent movement of said other valve control member in response to an increase in the applied force to engage and move the other of said valve means to a position establishing pressure fluid flow through one of said flow passages, an expansible fluid pressure chamber in said housing, said one valve control member defining a movable wall of said chamber and normally opposing fluid pressure expansion of said chamber, and passage means in said housing connected in open pressure fluid communication between said chamber and the established pressure fluid flow in said one flow passage, said one valve control means being further movable in response to the force of the established fluid pressure in said chamber acting thereon and additive to the applied force transmitted thereto through said resilient means to move said one valve means to a position establishing pressure fluid flow through the other of said flow passages in a time sequence substantially simultaneous with the establishment of the pressure fluid flow in said one flow passage.

8. In a fluid pressure system having a pair of fluid pressure sources and a pair of fluid pressure responsive motors, a control valve comprising a housing, means within said housing defining a pair of pressure fluid flow passages for connection between said sources and motors, respectively, a pair of valve means controlling pressure fluid flow through said flow passages, a pair of valve control members for operative engagement with said valve means, extension means on one of said valve control members, a resilient connection including a sleeve member slidable on said extension means and normally engaged with the other of said valve control members and spring means biased between said extension means and sleeve member, said valve control members and resilient connection being concertly movable in response to an applied force to move said one valve control member into engagement with one of said valve means and apply a loading force thereon, said sleeve member being slidable on said extension means to compress said spring means and increase the loading force on said one valve control member in response to subsequent movement of said other valve control member by the applied force into engagement with the other of said valve means to move said other valve means to a position establishing pressure fluid flow through one of said flow passages, an expansible fluid pressure chamber in said housing, said one valve control member being movable in said chamber and normally opposing fluid pressure expansion thereof, and other means within said housing providing passage for the established pressure fluid flow from said one flow passage into said chamber, said one valve control member being subsequently movable in response to the loading force thereon and the established fluid pressure in said chamber to move said one valve means to a position establishing pressure fluid flow through the other of said flow passages in a time sequence substantially simultaneous with the establishment of the pressure fluid flow through said one flow passage.

9. In a fluid pressure system having a pair of fluid pressure sources and a pair of fluid pressure responsive motors, a control valve comprising a housing, means within said housing providing a pair of pressure fluid flow passage respectively connected between said sources and motors, a pair of valve means normally urged to a position in said flow passages to interrupt pressure fluid communication between said sources and motors and to establish pressure fluid communication between said motors and the atmosphere, a pair of valve control members slidable in said housing for operative engagement with said valve means, force transmitting means normally interconnected between said valve control members including a link defining an extension on one of said valve control members and slidably received in the other of said valve control members, a sleeve member slidable on said link and normally retained against displacement therefrom, spring means on said link and normally urging said sleeve member toward engagement with said other valve control member, said other valve control member and force transmitting means being movable in response to an applied force to initially transmit the applied force to said one valve control member and concertly move said one valve control member into engagement with one of said valve means, said other valve control member being subsequently movable relative to said one valve control member in response to the applied force to engage and move the other of said valve means to a position in one of said flow passages interrupting pressure fluid communication between one of said motors and the atmosphere and establishing pressure fluid communication between one of said sources and said one motor and to simultaneously move said sleeve member on said link and compress said spring means thereby increasing the applied force transmitted to said one valve control member, an expansible fluid pressure chamber in said housing, said one valve control member defining a movable wall of said chamber, and a passage connected between said one flow passage and chamber to transmit the established fluid pressure from said one flow passage into said chamber, said one valve control means being further movable in response to the applied force thereon and in response to the established fluid pressure in said chamber acting thereon to move said one valve means to a position in the other of said flow passages interrupting pressure fluid communication between the other of said motors and the atmosphere and establishing pressure fluid communication between the other of said sources and said other motor substantially concurrently with the establishment of fluid pressure communication between said one motor and source.

10. In a fluid pressure system having a pair of fluid pressure sources and a pair of fluid pressure responsive motors, a control valve comprising a housing, means within said housing providing a pair of pressure fluid flow passages for connection between said sources and motors, respectively, a pair of valve means controlling said flow passages, a pair of valve control means in said housing for operative engagement with said valve means, extension means connected with one of said valve control means and having a free end slidable in the other of said valve control means, said one valve control means defining with said housing an expansible chamber, a resilient connection between said valve control members including spring means in said other valve control member and engaged with the free end of said extension means to urge said one valve control member toward operative engagement with one of said valve means, said other valve control member and resilient connection being movable in response to an applied force to apply a loading force on said one valve control member and concertly move said one valve control member into engagement with said one valve means, said other valve control member being subsequently movable in response to the applied force to engage and move the other of said valve means to a position establishing pressure fluid flow in one of said flow passages and to simultaneously compress said spring means thereby increasing the loading force on said one valve control member, and other means in said housing providing passage for the established pressure fluid flow from said one flow passage into said chamber, said one valve control member being further movable in response to the loading force thereon and the established fluid pressure in said chamber to move said one valve means to a position establishing pressure fluid flow in the other of said flow passages substantially concurrently with that established in said one flow passage.

11. A control valve for fluid pressure comprising a housing having a pair of sets of ports therein, each port set including inlet and outlet ports, a pair of valve means controlling pressure fluid communication between the ports of said port sets, a pair of valve control members in said housing for operative engagement with said valve means, one of said valve control members being movable in response to an applied force to engage and move one of said valve means to a position establishing pressure fluid communication between the ports of one of said port sets, the other of said valve control means defining with said housing an expansible chamber, a resilient connection between said valve control members and responsive to movement of said one valve control member to concertly move said other valve control member into engagement with the other of said valve means and apply a pre-loading force thereon prior to the engagement of said one valve control member with said one valve means, and passage means connected between said chamber and the outlet port of said one port set, said other valve control means being further movable in response to fluid pressure in said chamber and the pre-loading force thereon to move said other valve means to a position establishing pressure fluid communication between the ports of the other of said port sets.

12. A control valve for fluid pressure comprising a housing having a pair of sets of ports therein, each port set including inlet, outlet and exhaust ports, a pair of valve means normally interrupting pressure fluid communication between the inlet and outlet ports and establishing pressure fluid communication between the outlet and exhaust ports of said port sets, respectively, a pair of valve control members in said housing for operative engagement with said valve means, a resilient connection between said valve control members, said valve control members and resilient connection being concertly movable in response to an applied force to engage one of said valve control members with one of said valve means and interrupt pressure fluid communication between the outlet and exhaust ports of one of said port sets, said resilient connection being thereafter compressed to increase the applied force on said one valve control member upon subsequent movement of the other of said valve control members relative to said one valve control member in response to the applied force to engage the other of said valve means interrupting pressure fluid communication between the outlet and exhaust ports of the other of said port sets and thereafter move said other valve means to a position establishing pressure fluid communication between the inlet and outlet ports of said other port set, an expansible fluid pressure chamber in said housing, said one valve control member defining a movable wall of said chamber and normally opposing fluid pressure expansion thereof, and passage means connected between said chamber and the outlet port of said other port set, said one valve control member being further movable in response to the applied force thereon and the established fluid pressure in said chamber to move said one valve means to a position establishing pressure fluid communication between the inlet and outlet ports of said one port set in a time sequence substantially simultaneous with that established between the inlet and outlet ports of said other port set.

13. A control valve for fluid pressure comprising a housing having a pair of sets of ports therein, each port set including inlet and outlet ports, a pair of valve means controlling pressure fluid communication between the ports of said port sets, a pair of valve control members for operative engagement with said valve means, one of said valve control members defining with said housing an expansible chamber, a resilient connection between said valve control members, said resilient connection being movable with the other of said valve control members in response to an applied force thereon to transfer the applied force to said one valve control member and concertly move said one valve control member into engagement with one of said valve means, and said resilient connection being thereafter effective to increase the applied force on said one valve control member upon subsequent movement of said other valve control member relative to said one valve control member in response to an increased applied force to engage and move the other of said valve means to a position establishing pressure fluid communication between the ports of one of said port sets, and means within said housing providing passage for the established fluid pressure from the outlet port of said one port set into said expansible chamber, said one valve control member being further movable in response to the applied force transmitted thereto and in response to fluid pressure in said chamber to move said one valve means to a position establishing pressure fluid communication between the ports of the other of said port sets in a time sequence substantially simultaneous with that established between the ports of said one port set.

14. A control valve for fluid pressure comprising a housing having a pair of sets of ports therein, each port set including inlet and outlet ports, a pair of valve means controlling pressure fluid communication between the ports of said port sets, a pair of valve control members in said housing for operative engagement with said valve means, extension means on one of said valve control members, a resilient connection including spring means biased between said extension means and the other of said valve control members, said spring means being concertly movable with said other valve control member in response to an applied force to transfer the applied force to said one valve control member and move said one valve control member into engagement with one of said valve means, an expansible chamber defined in said housing by said one valve control member, said spring means being compressed to increase the applied force on said one valve control member upon subsequent movement of said other valve control member in response to an increase in the applied force to engage and move the other of said valve means to a position establishing pressure fluid communication between the ports of one of said port sets, and passage means in said housing connecting the outlet port of said one port set in open pressure fluid communication with said chamber, said one valve control member being further movable in response to the applied force transmitted thereto by said spring means and the additive force of the established fluid pressure in said chamber acting thereon to move said one valve means to a position establishing pressure fluid communication between the ports of the other of said port sets wherein the fluid pressures at the outlet ports of said port sets are substantially equal and are established substantially concurrently.

15. A control valve for fluid pressure comprising a housing having a pair of sets of ports therein, each port set including inlet and outlet ports, a pair of valve means controlling pressure fluid communication between the ports of said port sets, a pair of valve control means for operative engagement with said valve means, one of said valve control members being slidable in the other of said valve control members, spring means in said other valve control member and normally urging said one valve control member toward operative engagement with one of said valve means, said valve control members and spring means being concertly movable in response to an applied force to engage said one valve control member with said one valve means, an expansible chamber defined in said housing by said one valve control member, said spring means being compressed to increase the applied force on said one valve control member upon subsequent movement of said other valve control member in response to an increase in the applied force relative to said one valve control member and into engagement with the other of said one valve means to thereafter move said one valve means to a position establishing pressure fluid communication between the ports of one of said port sets, and means within said housing providing passage for the established fluid pressure from the outlet port of said one port set into said chamber, said one valve control member being further movable in response to the force of the established fluid pressure in said chamber acting thereon and additive to the applied force thereon to move said one valve means to a position establishing pressure fluid communication between the ports of the other of said port sets in a time sequence substantially simultaneously with that established between the ports of said one port set.

16. In the fluid pressure system according to claim 1 wherein said resilient connection includes extension means connected with said other application means, a sleeve member slidable on said extension means and engaged with said other application means, and resilient means biased between said extension means and sleeve member.

17. In the fluid pressure system according to claim 1 wherein said resilient connection includes extension means connected with said one application means, a sleeve member slidable on said extension means and engaged with said other application means, and resilient means biased between said extension means and sleeve member.

18. In the fluid pressure system according to claim 1 wherein said resilient connection includes extension means having opposed end portions, one of said end portions being connected with said other application means, and yieldable means in said one application means, said yieldable means being engaged between said one application means and the other of said end portions.

19. In the fluid pressure system according to claim 18 wherein said yieldable means includes piston means slidable in said one application means and engaged with said other end portion of said extension means, and spring means for urging said piston means into engagement with said other end portion.

20. In the fluid pressure system according to claim 1 wherein said resilient connection includes extension means having opposed end portions, one of said end portions being connected with said one application means, and yieldable means engaged between other end portion of said extension means and said other application means.

21. In the fluid pressure system according to claim 20 wherein said yieldable means includes piston means slidable in said other application means and engaged with said other end portion of said extension, and spring means biased between said piston means and other application means.

22. The control valve according to claim 11 comprising a lost motion connection between said valve control members wherein said one valve control member is movable in response to the applied force into lost motion engagement with said other valve control member, said valve control members being thereafter concertly movable to urge said other valve means to the position establishing pressure fluid communication between the ports of said other port set upon the failure of pressure fluid communication between the ports of said one port set.

23. The control valve according to claim 11 comprising a pair of spaced abutment surfaces on said valve control members wherein said one valve control member is movable in response to the applied force to engage the abutment surface thereon with the abutment surface on said other valve control member, said valve control members being thereafter concertly movable in response to the applied force to move said other valve means to the position establishing pressure fluid communication between the ports of said other port set in the event of the failure of pressure fluid communication between the ports of said one port set.

24. The control valve according to claim 11 wherein said resilient connection includes extension means engaged with said one valve control member, a sleeve member slidable on said extension means and normally engaged with said other valve control member, and spring means biased between said extension means and sleeve member.

25. The control valve according to claim 11 wherein said resilient connection includes extension means engaged between said valve control members, and yieldable means in said one valve control member and engaged with said extension means to urge said other valve control member toward engagement with said other valve means.

26. The control valve according to claim 25 wherein said yieldable means includes piston means slidable in said one valve control member, an end portion on said extension means for engagement with said piston means, and spring means for urging said piston means into engagement with said end portion.

27. The control valve according to claim 26 including a pre-compressed metering spring contained within said one valve control member, and a spring retainer member positioned in abutting engagement between one end of said pre-compressed metering spring and said one valve control member, said spring means being biased between said retainer member and said piston means.

28. The control valve according to claim 11 wherein said resilient connection includes extension means having opposed end portions, one of said end portions being engaged with said one valve control member, and yieldable means in said other valve control member, said yieldable means being engaged between the other end portion of said extension means and said other valve control member.

29. The control valve according to claim 28 wherein said yieldable means includes piston means slidable in said other valve control member and engaged with said other end portion of said extension means, and spring means biased between said piston means and other valve control member.

References Cited in the file of this patent

FOREIGN PATENTS

| | | |
|---|---|---|
| 798,816 | Great Britain | July 30, 1958 |
| 1,132,453 | Germany | June 28, 1962 |